United States Patent [19]

Kuttler et al.

[11] 4,243,086

[45] Jan. 6, 1981

[54] CLAMP-LIKE, SHEET-METAL, SLIP-ON NUT

[75] Inventors: Otto Kuttler, Lorrach; Klaus Muller, Weil-Haltingen, both of Fed. Rep. of Germany

[73] Assignee: A. Raymond, Lorrach, Fed. Rep. of Germany

[21] Appl. No.: 52,427

[22] Filed: Jun. 26, 1979

[30] Foreign Application Priority Data

Jun. 27, 1978 [DE] Fed. Rep. of Germany ....... 2828078

[51] Int. Cl.³ .............................................. F16B 39/00
[52] U.S. Cl. .................................. 411/174; 411/523; 411/527
[58] Field of Search ................. 151/41.75, 41.74, 41.7; 85/36

[56] References Cited

U.S. PATENT DOCUMENTS

| 2,328,757 | 9/1943 | Tinnerman | 85/36 |
| 2,339,664 | 1/1944 | Tinnerman | 85/36 X |
| 2,596,056 | 5/1952 | Tinnerman | 403/21 |
| 2,934,919 | 5/1960 | Barta et al. | 151/41.75 X |
| 3,308,708 | 3/1967 | Holton | 151/41.75 X |
| 3,426,818 | 2/1969 | Derby | 151/41.75 |

FOREIGN PATENT DOCUMENTS

| 2282065 | 3/1976 | France | 151/41.75 |
| 868086 | 5/1961 | United Kingdom | 151/41.75 |
| 1082688 | 5/1967 | United Kingdom | 151/41.75 |
| 1106905 | 3/1968 | United Kingdom . | |
| 1190378 | 5/1970 | United Kingdom . | |
| 1353523 | 5/1974 | United Kingdom | 151/41.75 |

*Primary Examiner*—James T. McCall
*Attorney, Agent, or Firm*—Finnegan, Henderson, Farabow, Garrett & Dunner

[57] ABSTRACT

A clamp-like, slip-on nut for fitting on the edge of a support having a perforation therethrough, the nut being formed by bending a piece of sheet metal into a planar lower leg having a passageway therethrough and an upper leg having a structure forming a threaded aperture for receiving a screw inserted through the passageway, the perforation and the aperture, and a device for centering the aperture with the perforation including a substantially annular strip enclosing the passageway cut from the central portion of the lower leg, the strip being surrounded by a cutaway portion except for an integral connection between the strip and the leading edge portion of the lower leg, the strip rising slightly in its trailing edge portion toward the upper leg.

9 Claims, 7 Drawing Figures

CLAMP-LIKE, SHEET-METAL, SLIP-ON NUT

This invention relates to a clamp-like, slip-on, nut for fitting on the edge of a support having a perforation therethrough, the nut being formed by bending a piece of sheet metal into a planar lower leg having a passageway therethrough and an upper leg having an aperture providing a threaded structure for receiving a screw inserted through a perforated sheet, the passageway, the perforation and the aperture for binding the sheet to the support.

BACKGROUND OF THE INVENTION

Slip-on, sheet-metal, nuts are used to connect supports such as, for instance, motor vehicle body sheet metal with other parts. Such nuts usually have a centering strip for allowing preassembling of the sheet-metal nut on the support before the assembly proper and requiring no special holding during the subsequent fastening of the screw, whereby assembly is greatly facilitated especially where the fastening holes are inaccessible, except by the screw.

In conventional slip-on nuts, the centering strip is usually stamped out only across approximately three-quarters of the circumference of the circular passageway in the planar or, so-called, lower leg of the nut. The centering strip is stamped through from the outside surface of the nut to place the strip between the two legs of the nut. Rough edges are thus created which not only prevent the strip from returning into the plane of the lower leg, from which it was stamped, under the inherent elasticity of the strip, but also tend to scratch the support onto which the nut is fitted. Thus, both the strip and the edges of the nut in the lower leg around the strip tend to mar the surface of the inserted support.

If the support is sheet metal plate coated with only one protective layer, for instance a layer of enamel, then this layer must not be damaged by the assembly procedure. When the conventional nut is fitted on the support, however, the result is that the usually sharp edges of the centering strip scrape over the layer of enamel, because of the clamping force of the upper and lower legs, so that the metal surface at these fastening points is scratched bare and rusting is encouraged.

SUMMARY OF THE INVENTION

It is the object of the invention, therefore, to provide a centering region of the slip-on nut so that the centering strip will return very easily to the plane of the lower leg when the sheet-metal nut is being fitted, and so that, in this manner, any layer of enamel on the support will not be scratched by the slip-on nut.

The problem is solved by the present approach, first of all, in that the outer cut edge of the centering strip is surrounded by a clearance by the stamping process. The risk of scratching is further minimized and the centering effectiveness further improved by refinements as illustrated and described hereinafter.

The accompanying drawings, which are incorporated in and constitute a part of the specification, illustrate one embodiment of the invention and, together with the description, serve to explain the principles of the invention.

DETAILED DESCRIPTION OF THE PREFERRED EMBODIMENT

Figure 3:
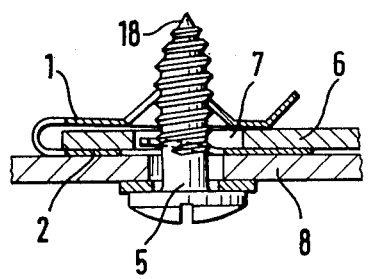
FIG. 3 shows the slip-on nut of FIG. 2 in operation with a tightened screw.

The slip-on nut shown in the figures is designed as a sheet metal clamp having an upper leg 1 and lower leg 2 bent toward each other. Upper leg 1 has a known asymmetrical embossment forming a structure for a threaded aperture 3 for tightening a sheet-metal screw (FIG. 3) inserted through a passageway 4 in the lower leg 2. As shown by FIG. 3, the slip-on nut is fitted on the edge of a support 6 such as a plate or metal sheet and the leading edge of the nut is pressed on the support until the embossed thread of aperture 3 is located accurately above a fastening perforation 7 in the support 6.

For centering the embossed threaded aperture 3 above the associated perforation 7 in the support 6, an annular centering strip 9 is partially cut from the lower leg 2. The inner circle of the annular strip 9 forms the passageway 4, and the external cut edge 10 of the strip is surrounded by a clearance 11. The centering strip 9 is integrally connected to the leading edge portion 15 of the nut. Furthermore, the cleared centering strip 9 is bent upward from the leading edge of the nut slightly toward the upper leg 1 so that the centering strip 9 indexes into perforation 7 when the nut is fitted on the support 6. Thereupon, the part to be fastened to the support, which is shown as a metal sheet 8, as an example, can be tightened by means of the sheet metal screw 5 to the support 6.

Figure 7:
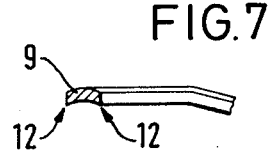
FIG. 7 is a cross-section, on an enlarged scale, of a perspective view of a portion of the centering strip of the invention, showing variation in the shape.

Care must be exerted when cutting the centering strip 9 that any burrs 12 (FIG. 7) of the cut edge point away from that side of strip 9 which moves along the support 6 so that latter will not be scratched by these burrs when the sheet-metal nut is slipped on the support. For a commensurate width, this strip 9 may also be slightly convex in the upper direction, that is, toward upper leg 1.

Figure 1:
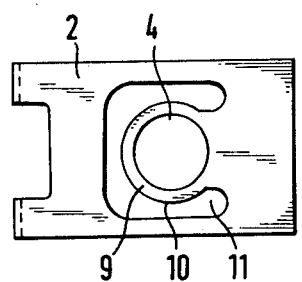
FIG. 1 is a top view of the lower leg of a slip-on nut in accordance with the invention, the upper leg being broken away.
Figure 4:
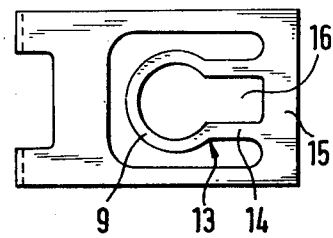
FIGS. 4, 5, and 6, depict the top views of the lower leg of additional embodiments of the slip-on nut of the invention.
Figure 2:
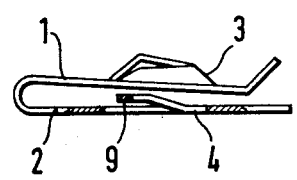
FIG. 2 is a side view of the slip-on nut of the invention with a partial section through the centering region.

The passageway 4 in the lower leg 2, in the embodiment of FIG. 4, is stamped out so as to be in the shape of a keyhole, the rectangular portion 16 of the keyhole abutting the leading edge portion 15. The region 11, which is cut clear, is extended parallel to the rectangular portion 16 so that two narrow connecting bands 14 remain forming the connection of the strip with leading edge portion 15. This allows the centering strip 9 to be elastic over a considerable range, permitting it to be moved also over enamel layers that have not yet fully cured, without the danger of scratching.

Figure 5:
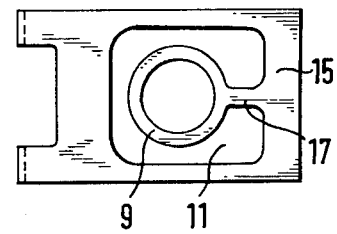

As regards the embodiment shown in FIG. 5, the annular centering strip 9 is almost entirely surrounded by the clearance 11, and in lieu of two connecting bands as in FIG. 4, only a single narrow band 17 is provided which connects centering strip 9 with the leading edge portion 15 of the lower leg 2. The substantially closing of the centering strip 9 is meant to prevent the tip 18 of screw 5 from hitting the edge of the support perforation 7 when inserted into it, where it might damage a layer of enamel—as might conceivably take place for the keyhole passageway 16 of FIG. 4.

Figure 6:
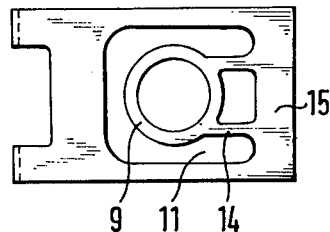

In order to achieve a firmer connection between the annular centering strip 9 and the leading edge portion 15 traversely to the axis of the passageway 4, the embodiment of FIG. 6 shows the centering strip 9 being connected by two narrow bands 14 to the leading edge portion 15. The inner circle of the annular strip 9 is complete and the bands 14 are formed by a substantially rectangular area 19 being cut out of the lower leg 2 between the strip 9 and the leading edge 15. Thereby full protection for the edges of perforation 7 is achieved in the presence of optimal elasticity in spring release of the strip 9 together with stability in the plane of the lower leg 2.

It will be apparent to those skilled in the art that various modifications and variations can be made in the slip-on nut of the present invention without departing from the scope or spirit of the invention. Thus, it is intended that the present invention cover the modifications and variations of this invention provided they come within the scope of the appended claims and their equivalents.

What is claimed is:

1. In a clamp-like, slip-on, nut for fitting on the edge of a support having a perforation therethrough, the nut being formed by bending a piece of sheet metal into a planar lower leg having a passageway therethrough and an upper leg having a structure forming a threaded aperture for receiving a screw inserted through the passageway, the perforation and the aperture, a device for centering the aperture with the perforation comprising:

a substantially annular strip enclosing the passageway, said strip being cut from the central portion of said lower leg and having an integral connection with the leading edge portion of the lower leg as the nut is fitted on the support; and cutaway area means surrounding at least a major portion of said annular strip for providing a substantial clearance around the trailing portion of said strip as the nut is fitted on the support and for defining at least a portion of said integral connection between the opposing ends of the clearance;

said strip rising slightly in its trailing portion toward the upper leg.

2. The nut of claim 1 wherein the surface of said strip facing said upper leg is smooth, and wherein said strip is slightly convex from side to side throughout its length with respect to the upper leg.

3. The nut of claim 1 wherein said strip is almost entirely surrounded by said cutaway area means, and wherein said connection is a narrow band formed between opposing ends of said cutaway area means.

4. The nut of claim 1 wherein said strip is substantially surrounded by said cutaway area means, and wherein said connection is formed by two narrow bands formed between opposing ends of said cutaway area means.

5. The nut of claim 1 wherein said passageway is part of a keyhole-like opening extending toward said leading edge portion of said nut and wherein said connection includes two narrow bands formed between said keyhole-like opening and the ends of said cutaway area means.

6. The nut of claim 1 wherein said aperture is formed in an asymmetrical embossment in said upper leg for threadedly receiving said screw.

7. In a clamp-shaped slip-on nut made of sheet metal for fitting on the edge of a support plate having a perforation therethrough, the nut including a stamped thread in the upper leg and a slip-through hole in the lower leg, an annular centering strip being cut in the lower leg around the slip-through hole for centering the stamped thread above the perforation in the support plate, said centering strip being slightly bent up toward the upper leg in the rear as seen in the press-on direction of the nut, the improvement comprising:

a cutaway area for providing a substantial clearance surrounding the centering strip except for at least one narrow strip interconnecting the centering strip to the leading edge portion of the lower leg in the press-on direction of the nut.

8. The slip-on nut of claim 7 wherein two narrow strips interconnect the centering strip to the leading edge portion of the lower leg.

9. The slip-on nut of claim 8 wherein the open area of the slip-through hole is extended between said two narrow strips terminating at said leading edge portion of the lower leg.

* * * * *